(12) United States Patent
Yun

(10) Patent No.: US 8,012,248 B2
(45) Date of Patent: Sep. 6, 2011

(54) CENTRIFUGAL WET TYPE AIR CLEANER UTILIZING A SPIN VAPORIZER AND A SPIRAL ON THE BASIS OF A LABYRINTH EFFECT

(76) Inventor: Jangshik Yun, Gyeonggi-di (KR)

( * ) Notice: Subject to any disclaimer, the term of this patent is extended or adjusted under 35 U.S.C. 154(b) by 893 days.

(21) Appl. No.: 11/815,496

(22) PCT Filed: Jan. 23, 2006

(86) PCT No.: PCT/KR2006/000251
§ 371 (c)(1),
(2), (4) Date: Aug. 3, 2007

(87) PCT Pub. No.: WO2006/112590
PCT Pub. Date: Oct. 26, 2006

(65) Prior Publication Data
US 2008/0250933 A1      Oct. 16, 2008

(30) Foreign Application Priority Data

Feb. 3, 2005   (KR) ............... PCT/KR2005/000324
Oct. 20, 2005  (KR) ................ 10-2005-0099316

(51) Int. Cl.
*B01D 47/16*  (2006.01)
(52) U.S. Cl. ............... 96/244; 96/281; 96/282; 96/284; 96/286
(58) Field of Classification Search ............ 95/35, 218; 96/281–282, 286, 251
See application file for complete search history.

(56) References Cited

U.S. PATENT DOCUMENTS

| 2,527,015 A | * | 10/1950 | Lhota .............................. 261/91 |
| 3,149,935 A | * | 9/1964 | Jamison et al. ................. 95/218 |
| 3,358,413 A | * | 12/1967 | Kalika ............................ 96/282 |
| 3,852,408 A | * | 12/1974 | Ewan et al. ............... 423/243.1 |

(Continued)

FOREIGN PATENT DOCUMENTS

JP    59-206028 A1    11/1984

(Continued)

OTHER PUBLICATIONS

International Search Report for International Patent Application PCT/KR2006/000251.

*Primary Examiner* — Duane Smith
*Assistant Examiner* — Ives Wu
(74) *Attorney, Agent, or Firm* — Brooks Kushman P.C.

(57) ABSTRACT

This invention relates to a wet type centrifugal "filter less" air cleaner utilizing a labyrinth effect on the basis of spiral grooves for generating vortex flow, thus the separation of particular dust, mist can be absolutely, above 99.9% purified from air with the difference of specific gravity, 1:1000 between air and water under centrifugal force, 10000G-80000G after collecting pollution substances from air with an aqua viscosity of water mist. An wet type air cleaner utilizing a centrifugal impeller comprising: spiral grooves (416), a spin vaporizer (401) for large size, an ultra sonic vaporizer (482) for small size, an electric motor (433) with a centrifugal impeller 408, a drain trap (441) and humidity controller (442) installed on an exit pipe (432) etc. Therefore centrifugal wet type air cleaner make fresh air efficiently to be carried out by centrifugal force without using filters in the field of industrial cleanroom, hospital, asepsis laboratory, home appliances, military use for purifying poison gas, exhaust gas cleaner for automobiles and an industrial burner etc.

20 Claims, 15 Drawing Sheets

U.S. PATENT DOCUMENTS

| | | | |
|---|---|---|---|
| 4,272,499 A * | 6/1981 | Cason et al. | 423/243.08 |
| 4,375,975 A * | 3/1983 | McNicholas | 95/270 |
| 4,584,003 A | 4/1986 | Oda et al. | |
| 4,594,081 A * | 6/1986 | Kroll et al. | 96/235 |
| 4,829,781 A | 5/1989 | Hitzler | |
| 5,076,819 A * | 12/1991 | Sharrow | 95/151 |
| 5,343,831 A | 9/1994 | Collins | |
| 5,346,128 A * | 9/1994 | Wacker | 236/44 A |
| 6,293,121 B1 | 9/2001 | Labrador | |
| 6,964,555 B2 * | 11/2005 | Ochiai et al. | 415/204 |
| 7,077,886 B2 * | 7/2006 | Rosen | 95/218 |
| 2004/0151617 A1 * | 8/2004 | Zanakis et al. | 422/4 |

FOREIGN PATENT DOCUMENTS

| | | |
|---|---|---|
| JP | 07-298554 A | 11/1995 |
| JP | 11-333325 A | 12/1999 |
| KR | 20-0328651 Y1 | 9/2003 |
| KR | 10-2004-0043138 A | 5/2004 |
| KR | 10-2004-0043140 A1 | 5/2004 |
| KR | 10-2004-0098610 A1 | 11/2004 |
| KR | 10-2004-0099193 A1 | 11/2004 |
| KR | 20040098610 * | 11/2004 |
| KR | 10-0653137 B1 | 11/2006 |
| KR | 10-0716903 B1 | 5/2007 |
| WO | 2004/053305 A1 | 6/2004 |
| WO | 2005/075799 A1 | 8/2005 |

* cited by examiner

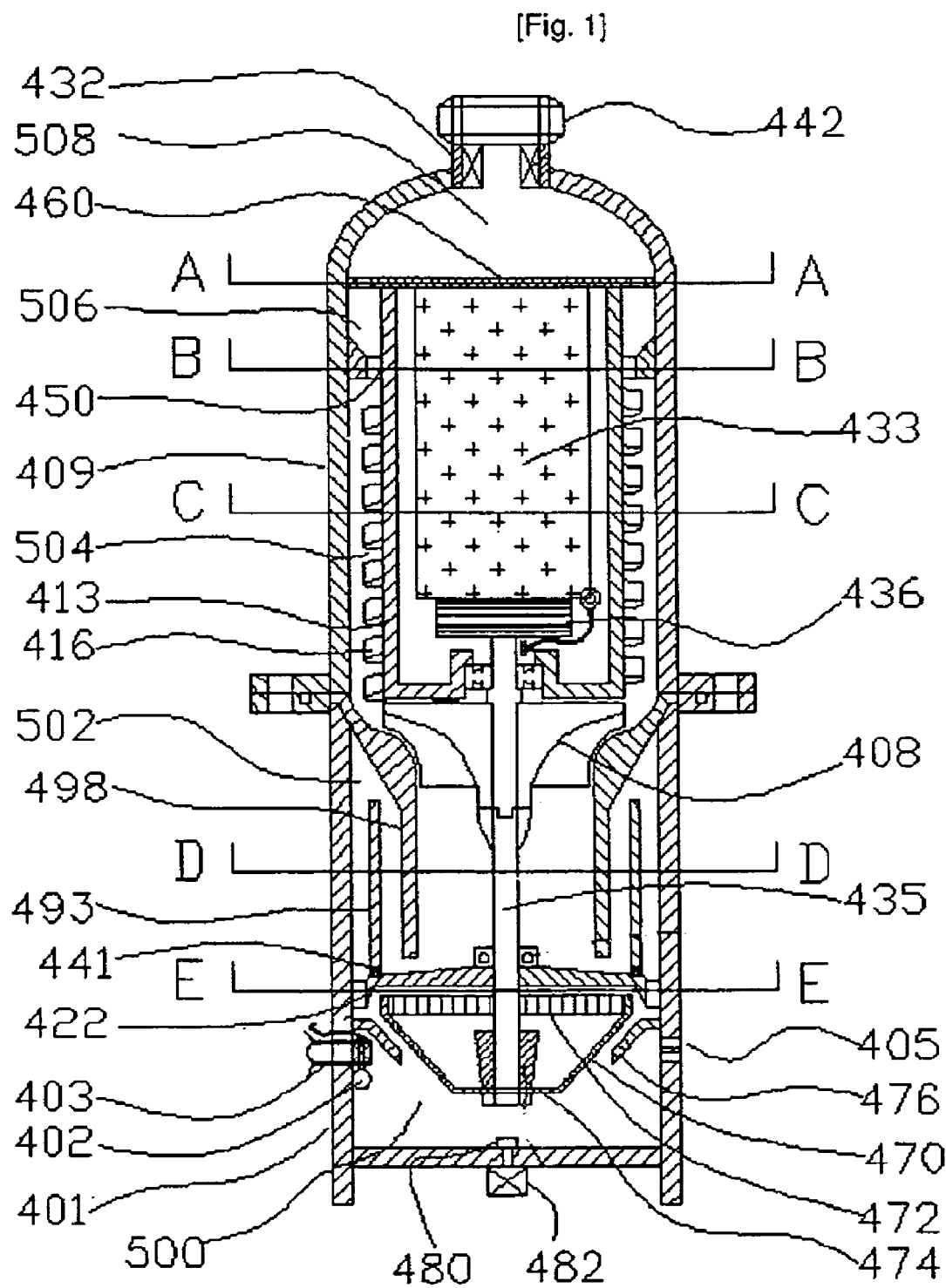
[Fig. 1]

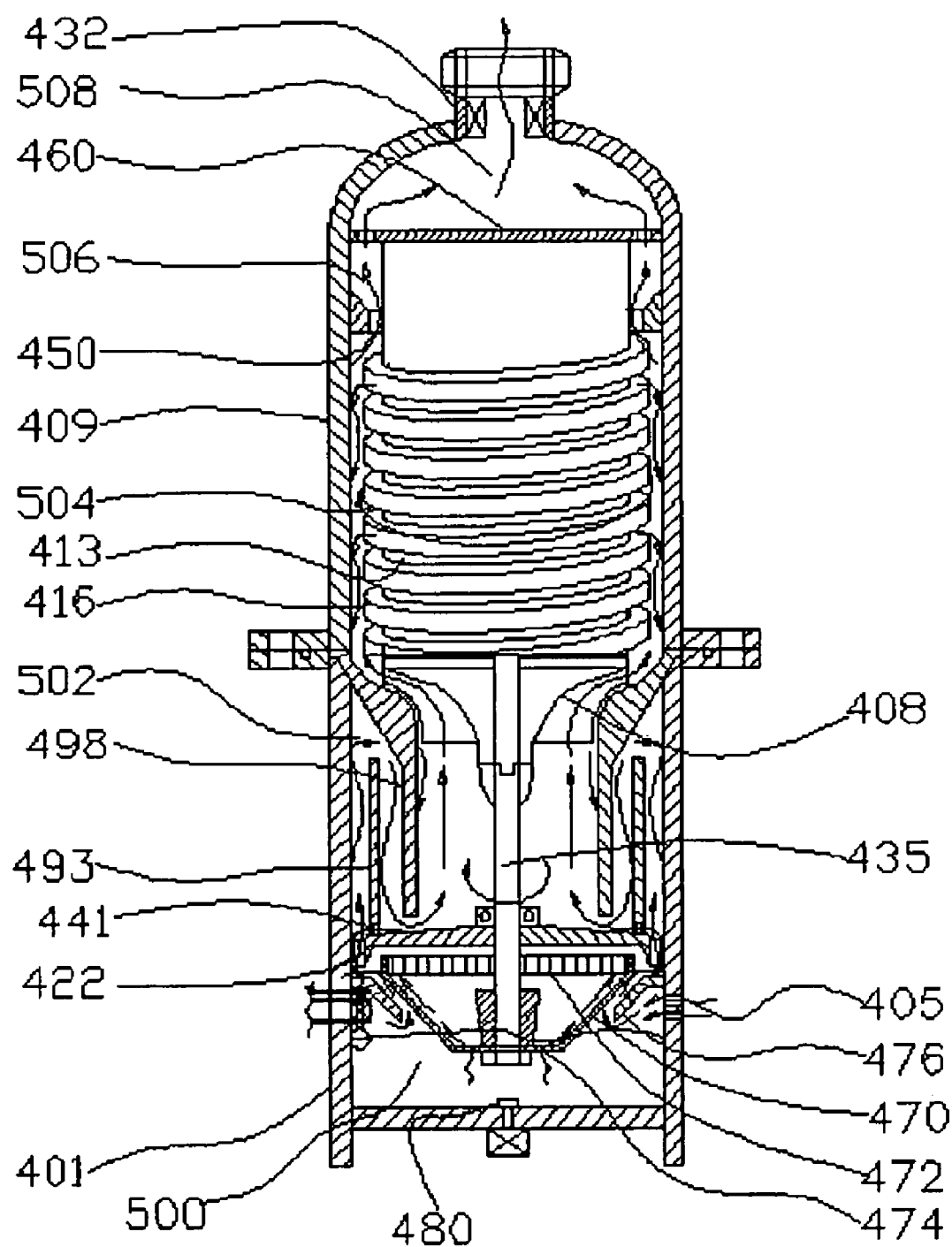
[Fig. 2]

[Fig. 3]
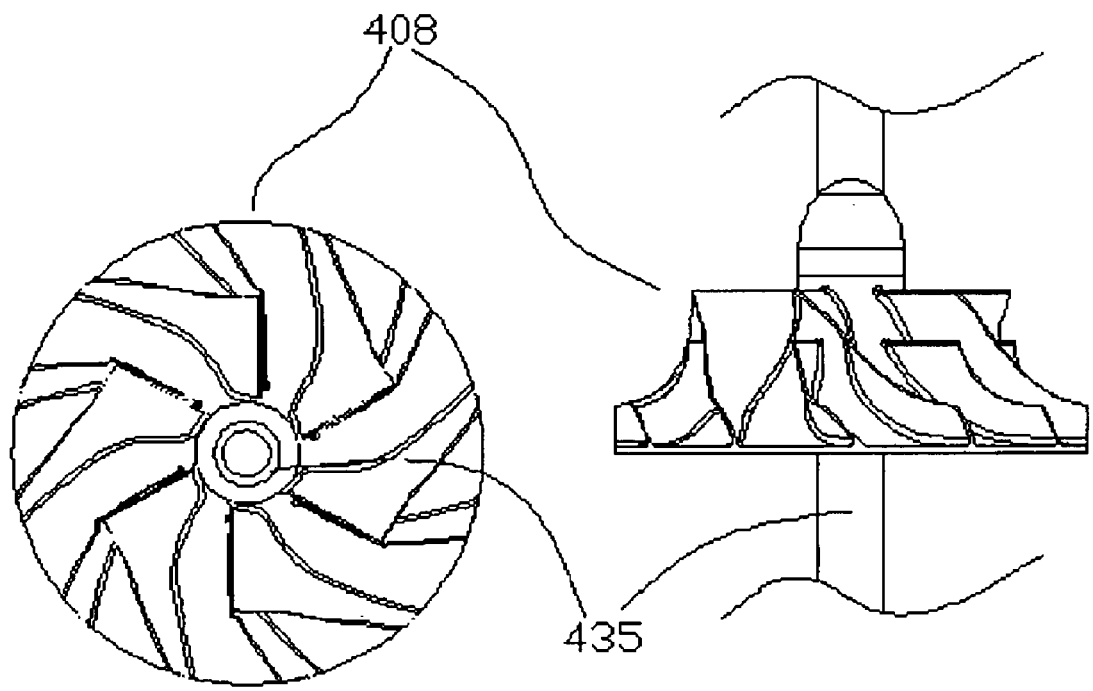
[Fig. 4]
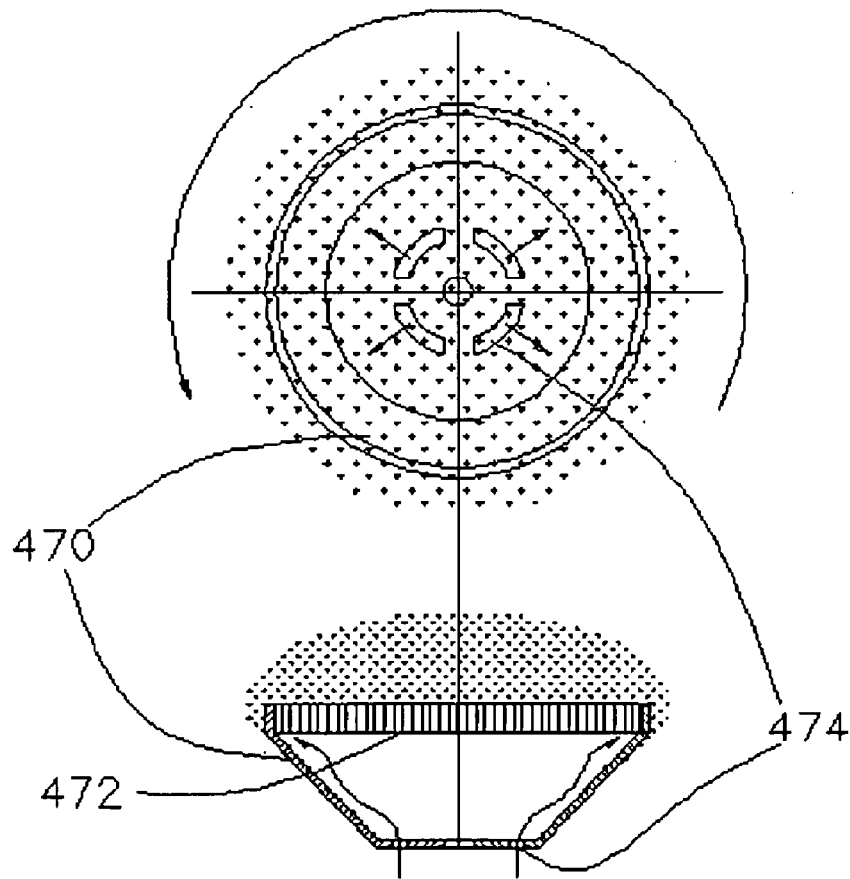

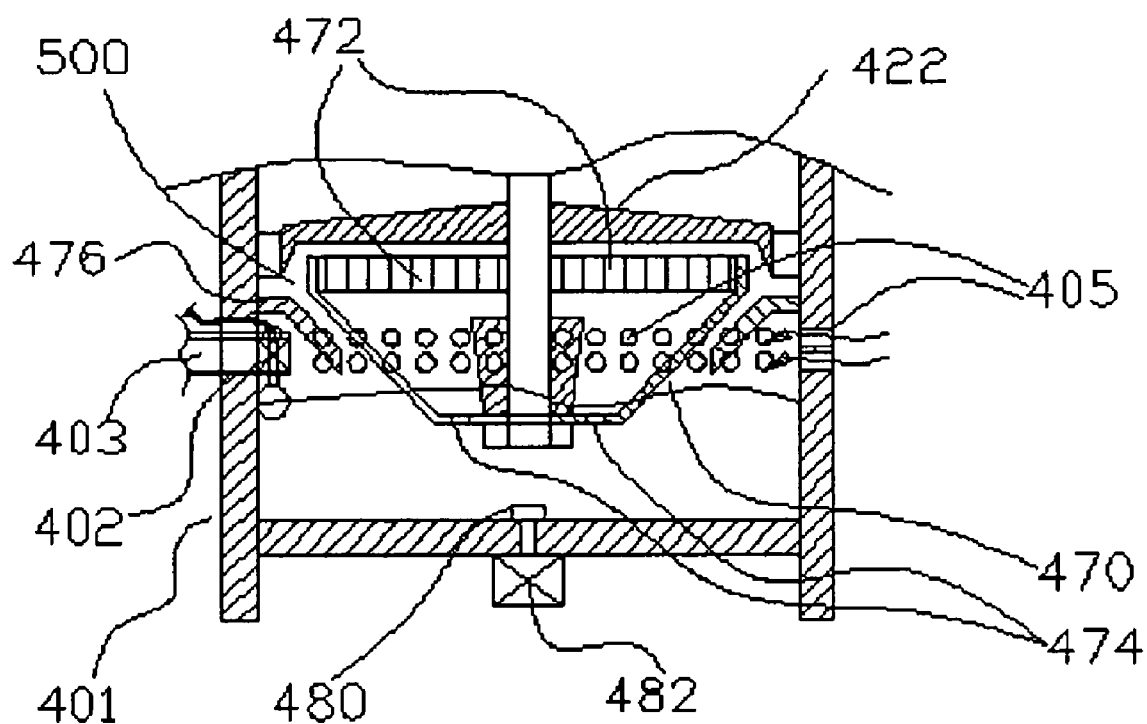
[Fig. 5]

[Fig. 6]
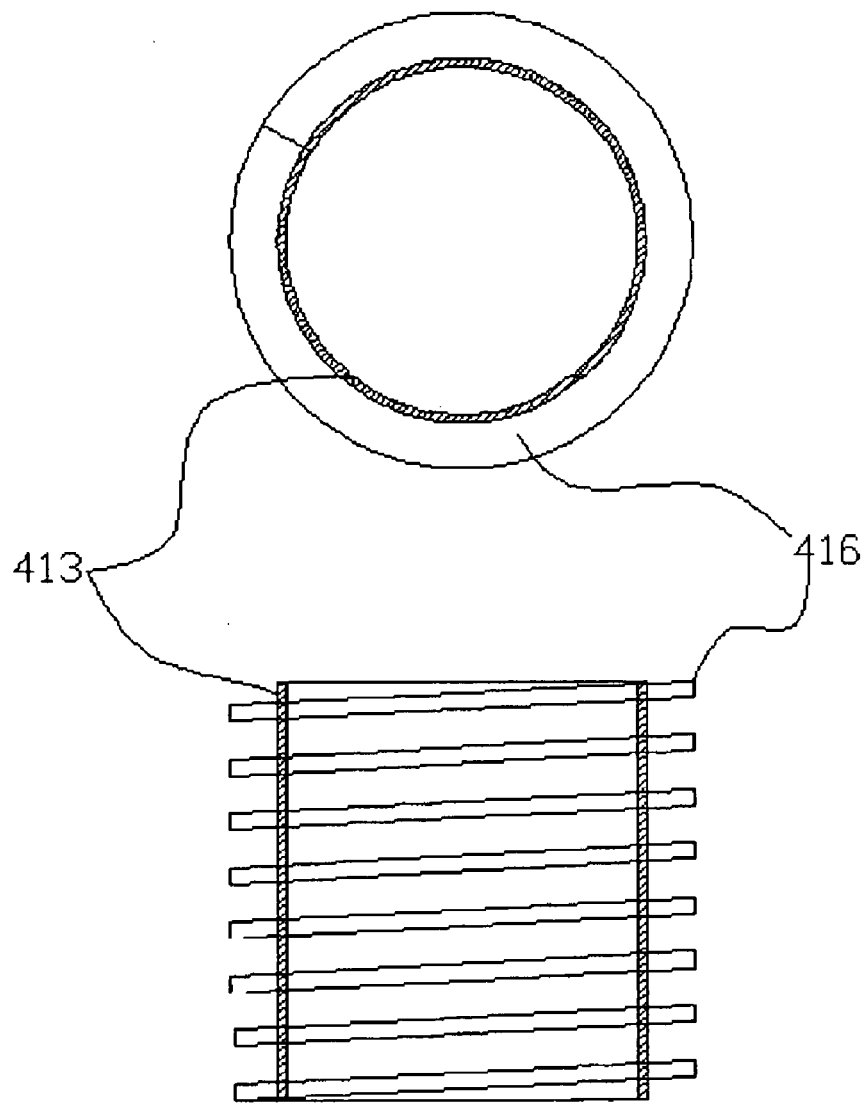
[Fig. 7]
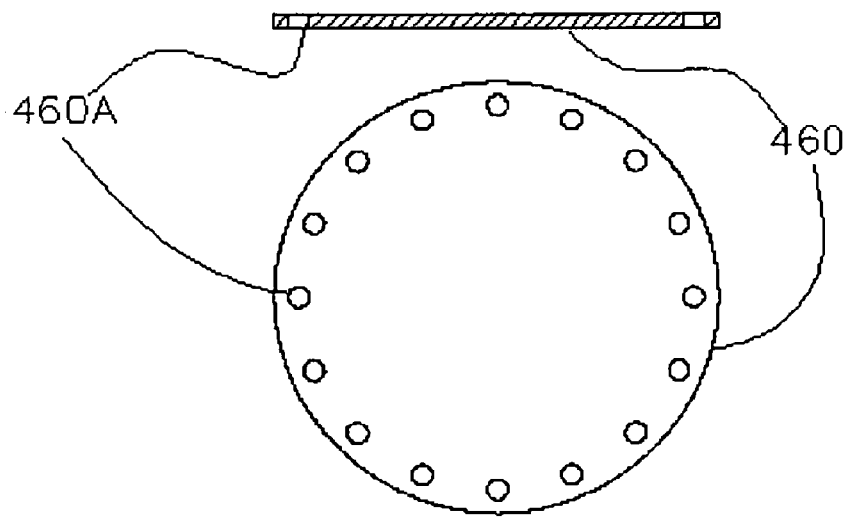

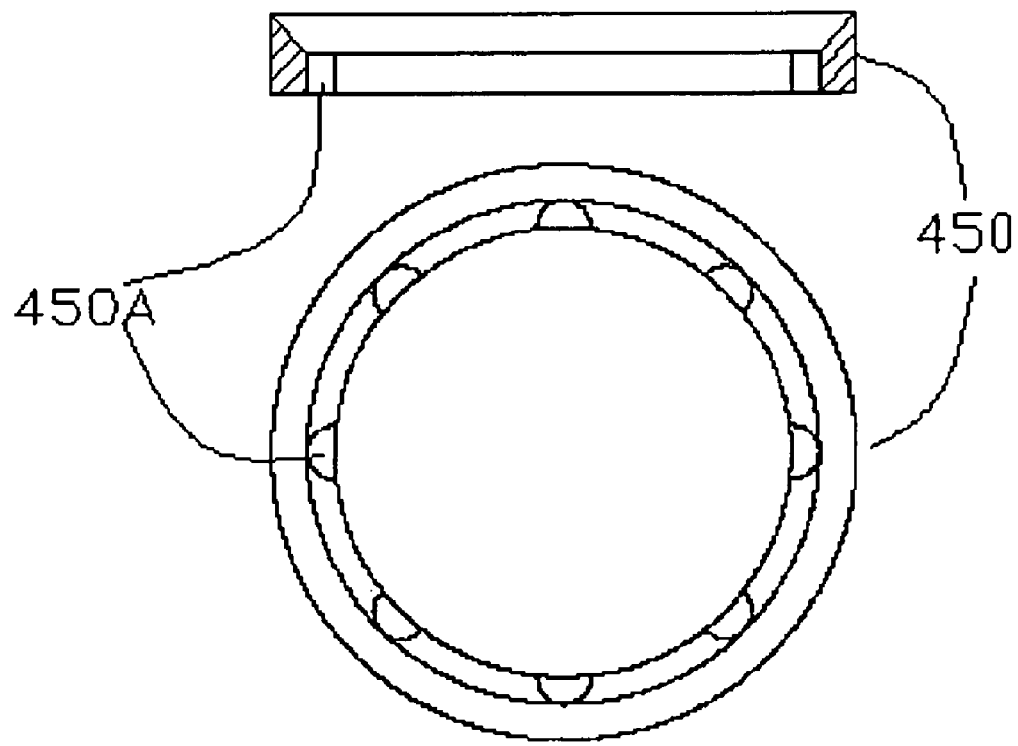
[Fig. 8]
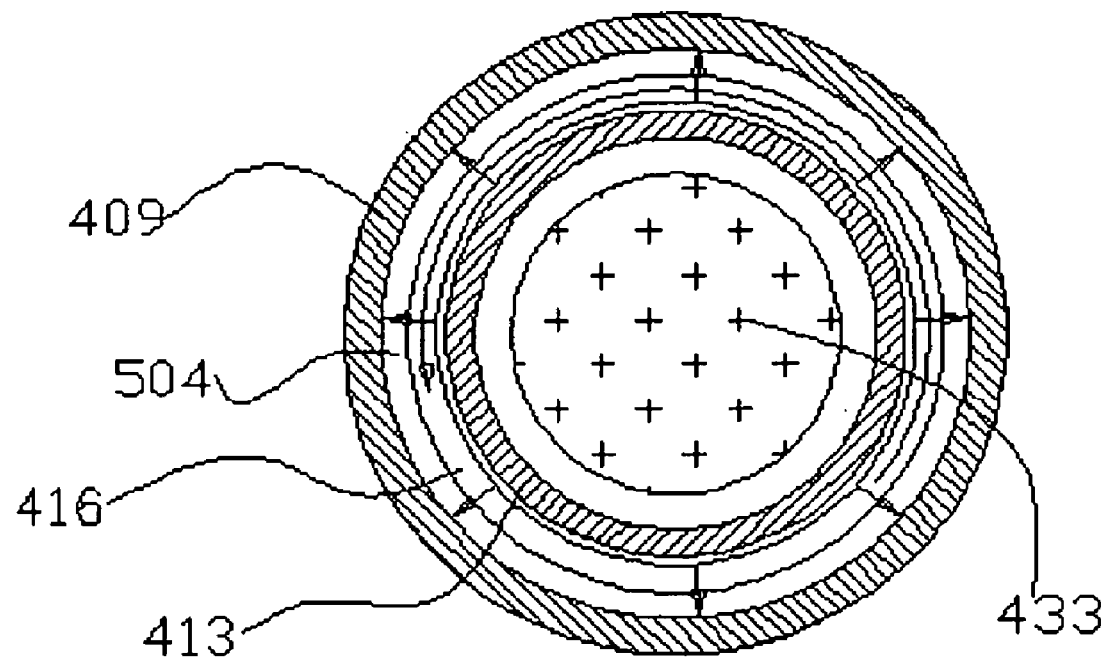
[Fig. 9]

[Fig. 10]
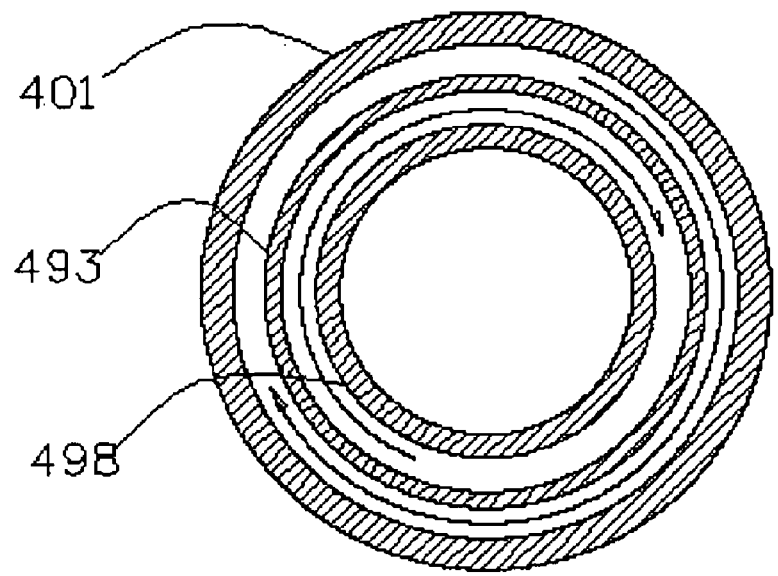
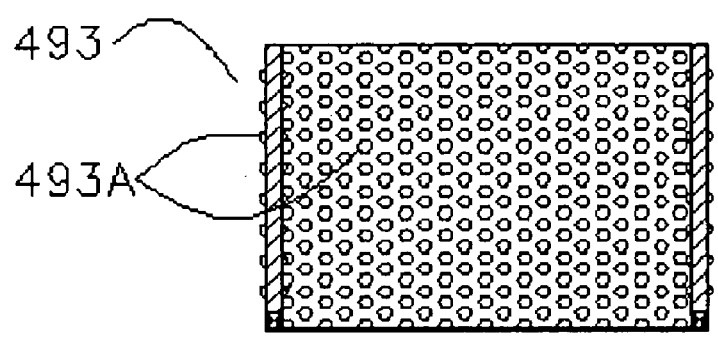
[Fig. 11]
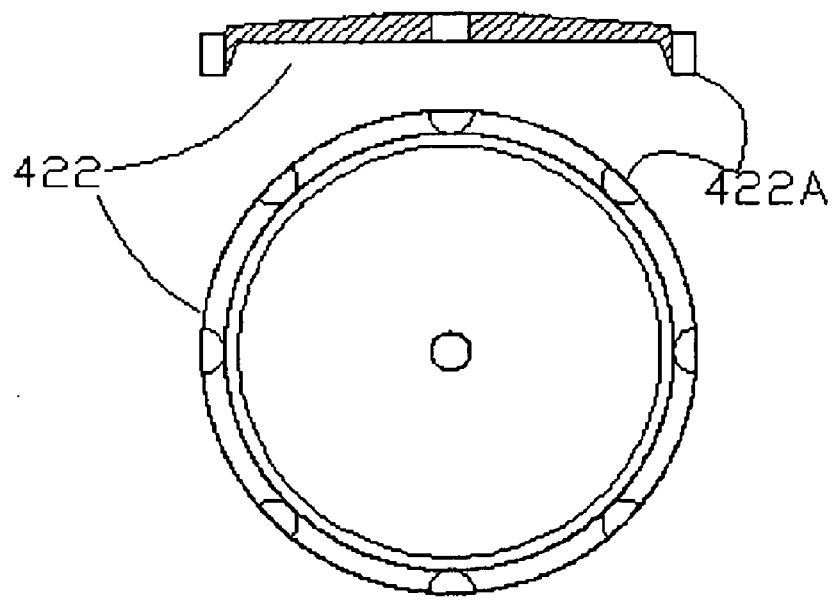

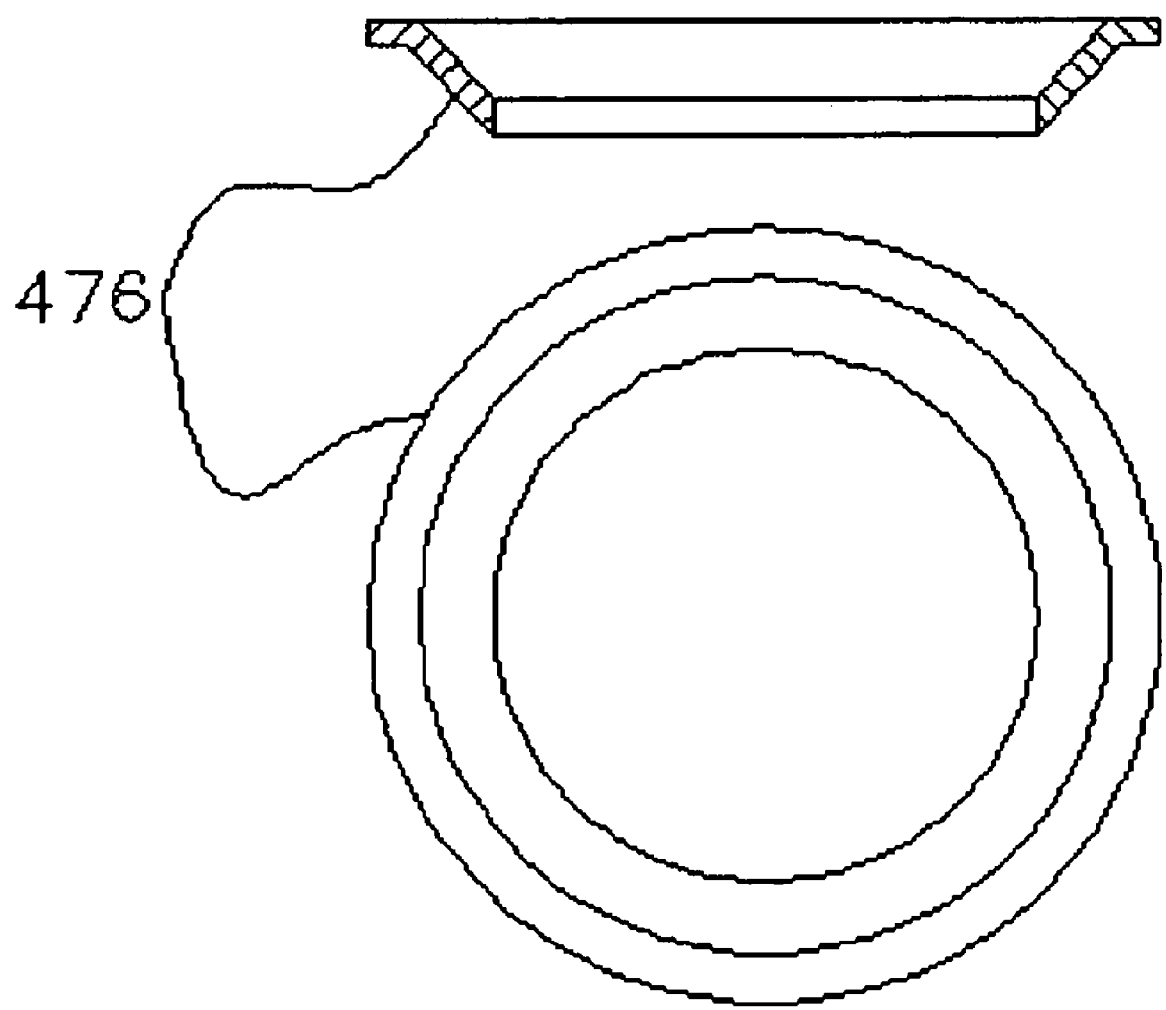
[Fig. 12]

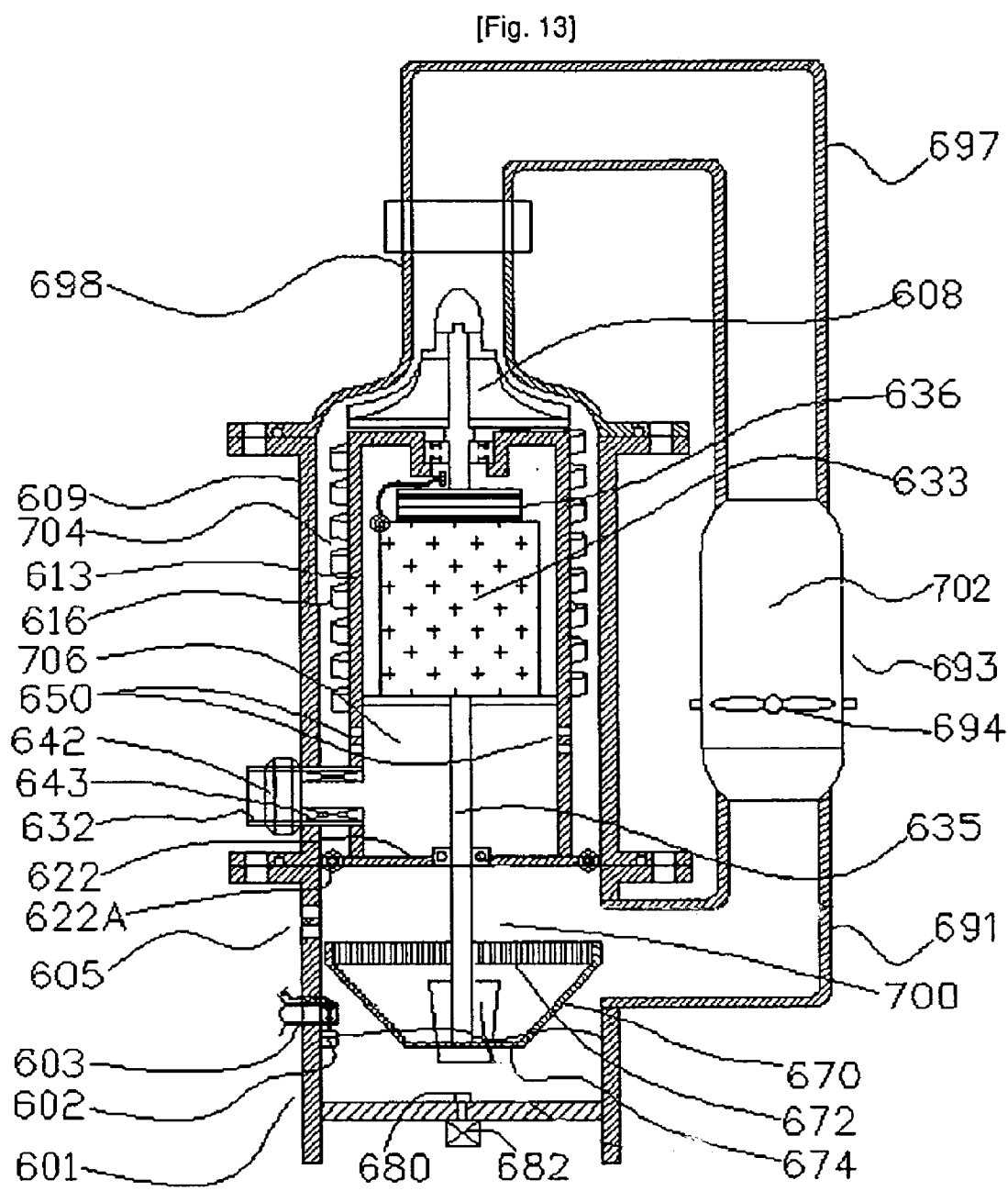

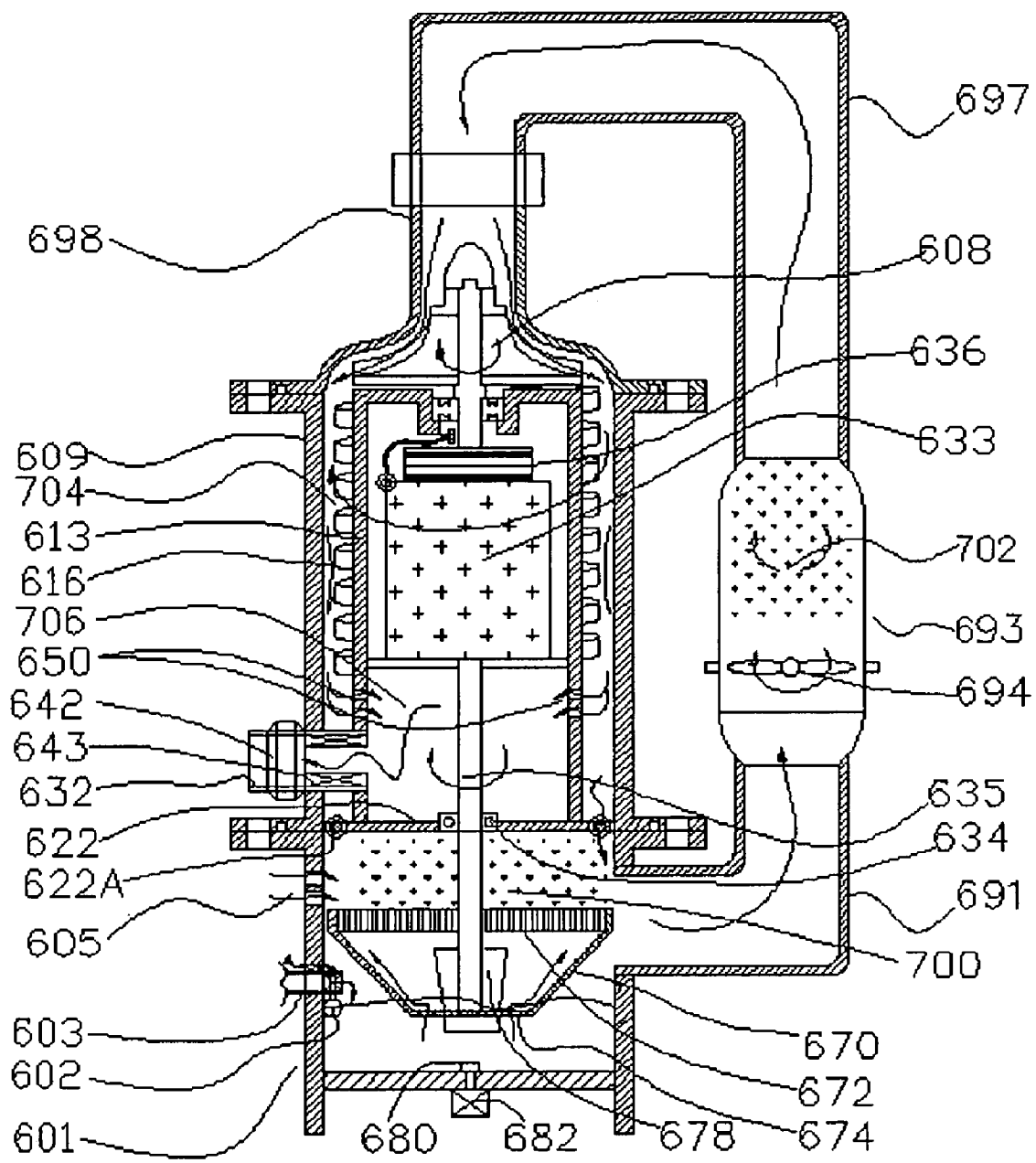
[Fig. 14]

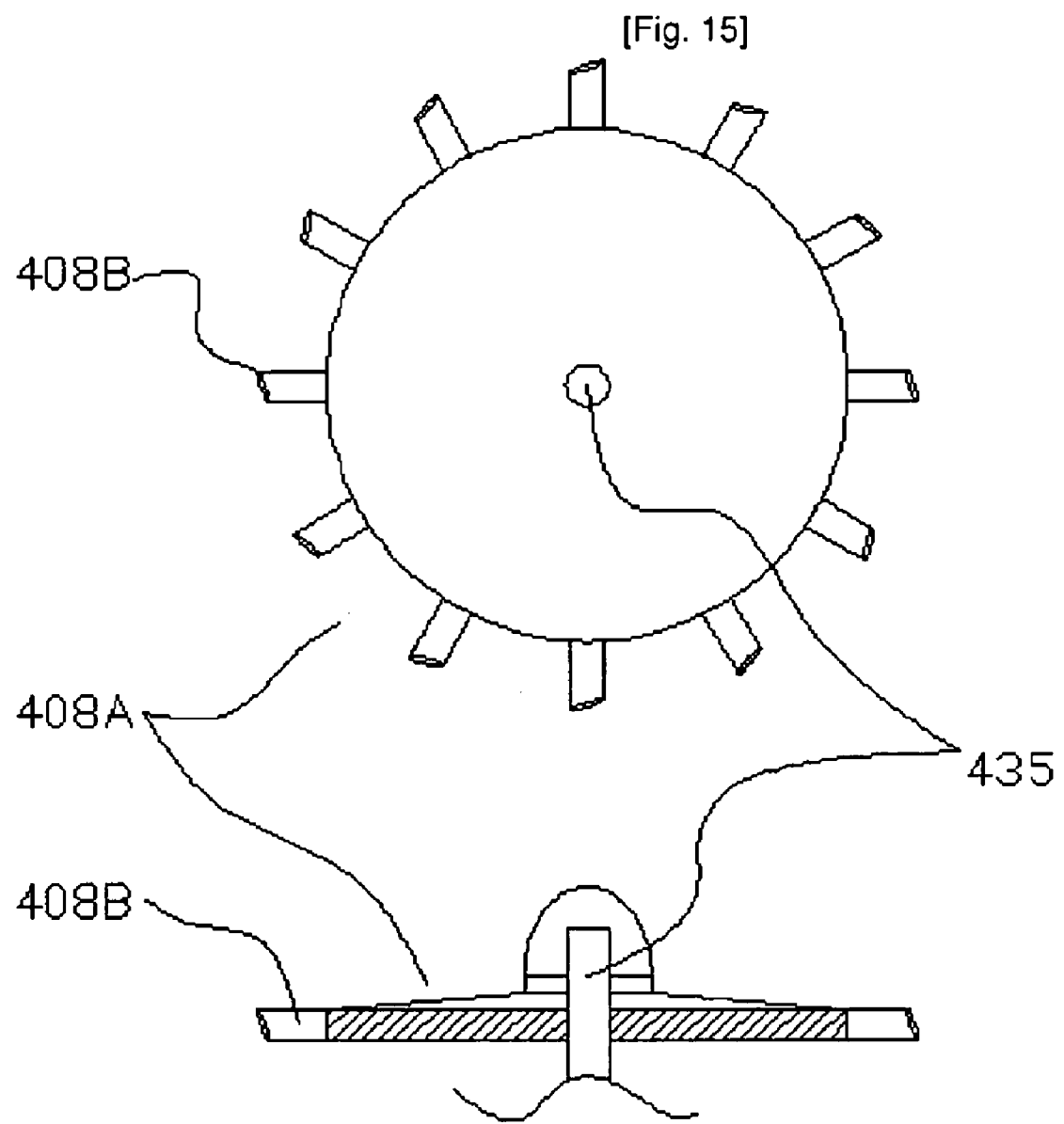

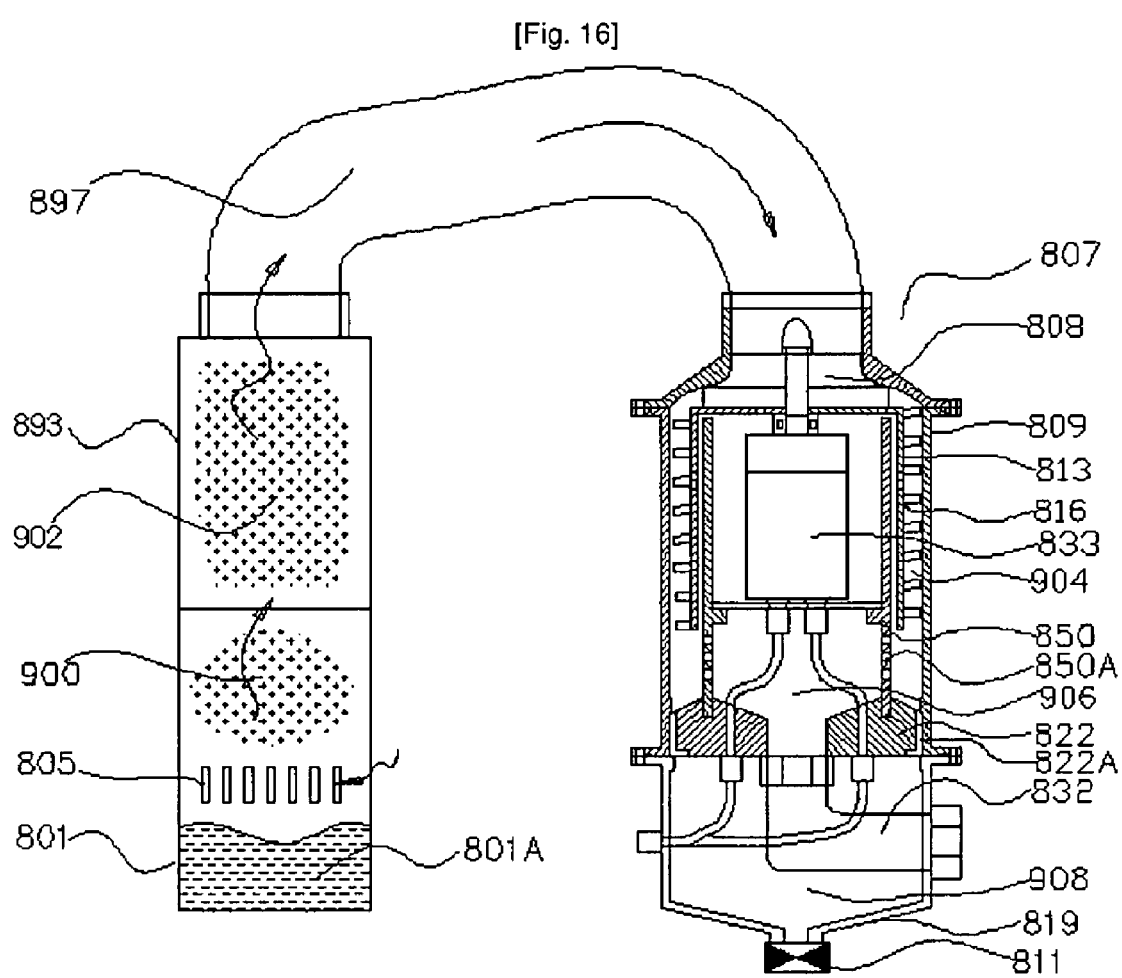
[Fig. 16]

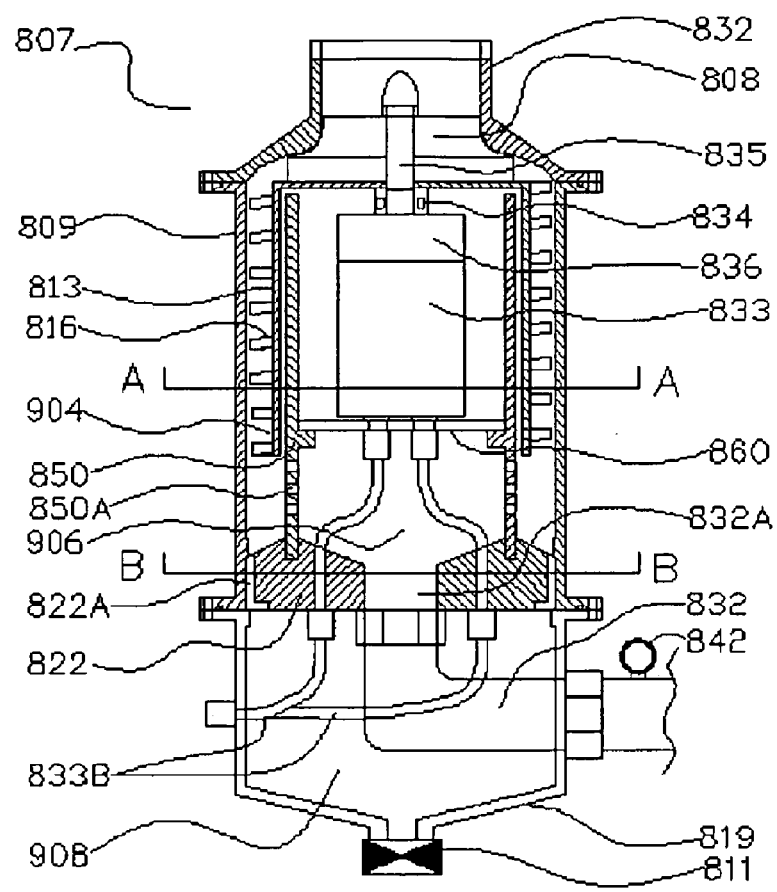
[Fig. 17]
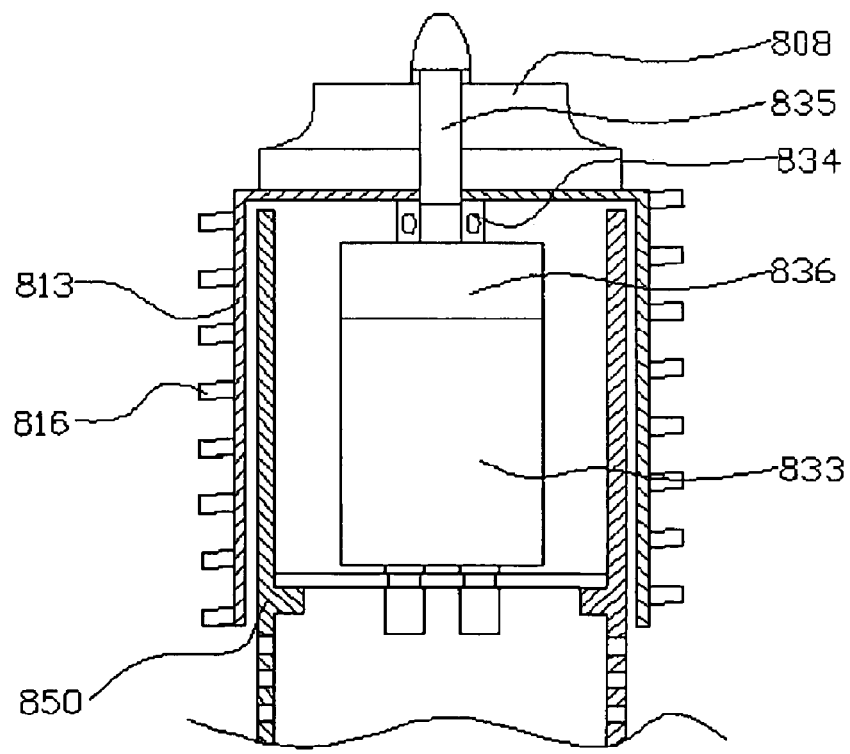
[Fig. 18]

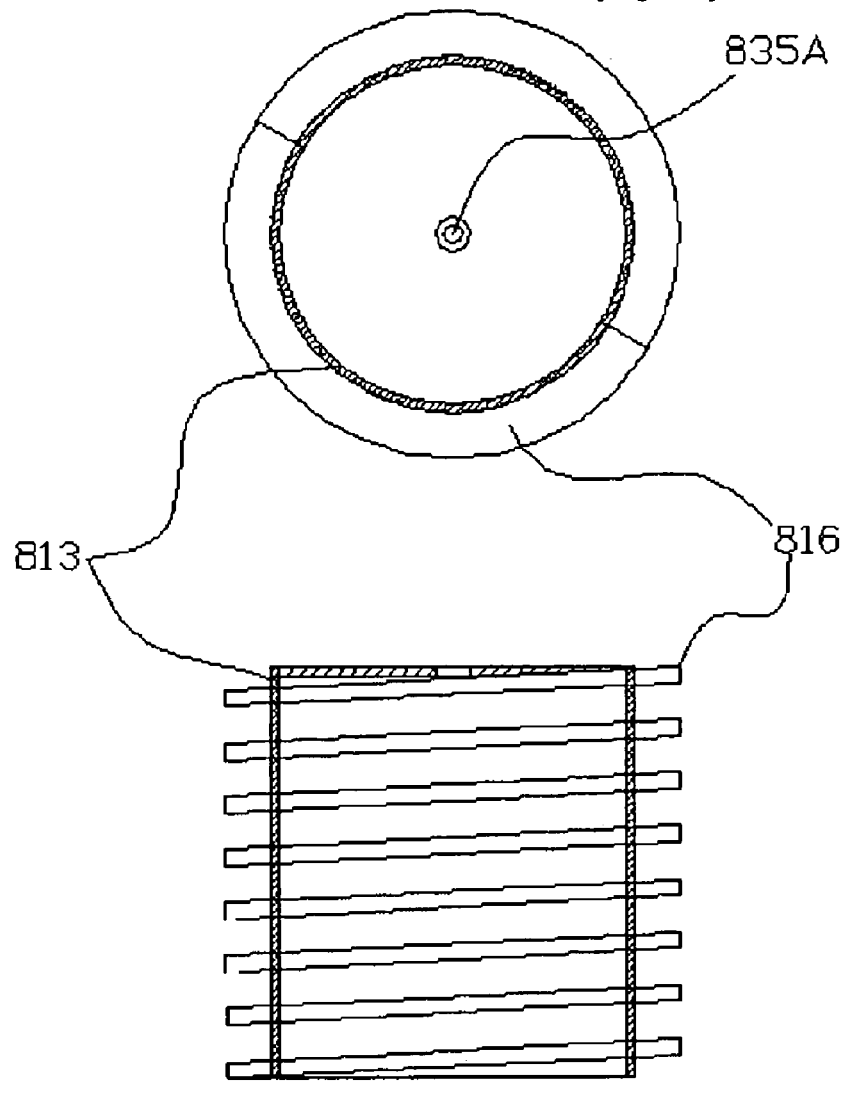
[Fig. 19]
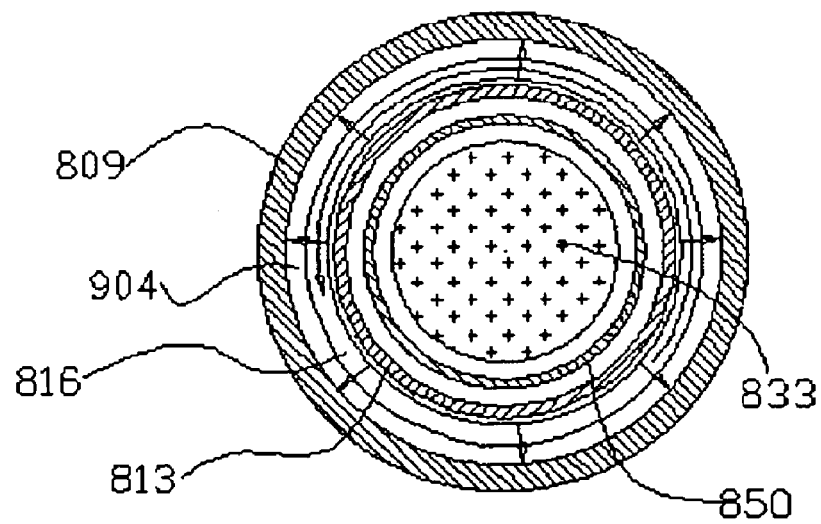
[Fig. 20]

[Fig. 21]
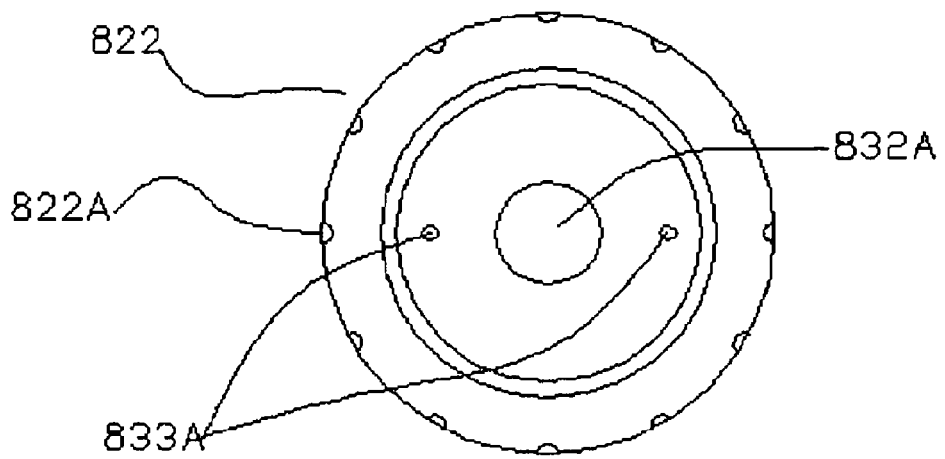
[Fig. 22]
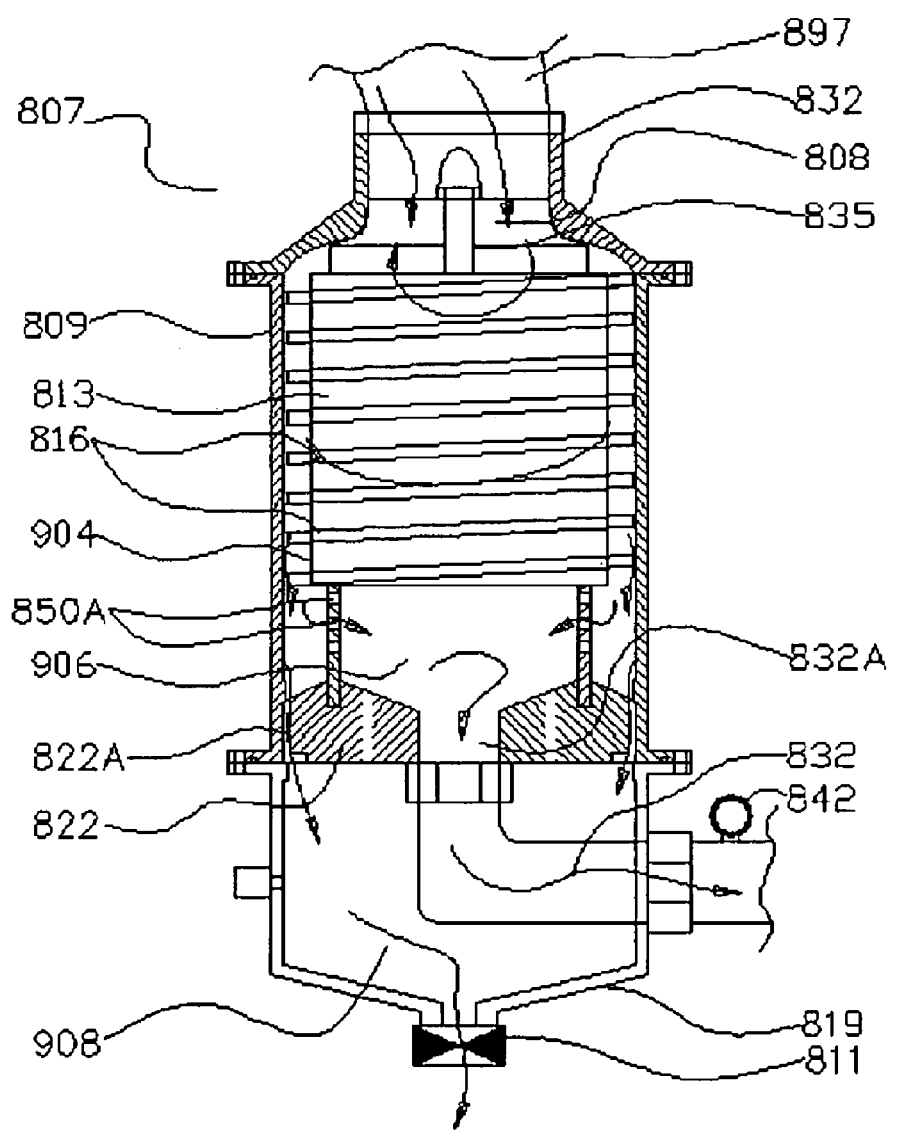

CENTRIFUGAL WET TYPE AIR CLEANER UTILIZING A SPIN VAPORIZER AND A SPIRAL ON THE BASIS OF A LABYRINTH EFFECT

TECHNICAL FIELD

This invention relates to a wet type air cleaner utilizing a centrifugal impeller for fresh air, thus the separation of pollution substances with scrubbing liquid can be absolutely eliminated from air with utilizing the difference of specific gravity (approximately 1:1000) between air and liquid by the strength of centrifugal force in the vortex generating structure such as centrifugal impeller and spiral grooves, since scrubbing the pollution material including dust, harmful gaseous substances, virus and bacteria in air with the positive three dimensional vortex stream of fine water droplets, mist and fog on the basis of natural water instead of using solid filters.

BACKGROUND ART

The disadvantages of the known air cleaner are classified with the following type;
Solid Filter: low purification efficiency due to clogging of pollution dust, unsanitary germ culture, occurring in succession of junk pollution material,
Negative ion: harmful gas, ozone ($O_3$) generation,
Conventional water filter: low cleaning efficiency due to passive water surface contact, scrubbing contact part of pollution substances only, high humidity with lot of water evaporation, as a result, the corrosion of electronic product, filling water frequently, and needs for germicidal chemicals,
Ultra violet rays Beam: low air purification efficiency,
Low temperature plasma: high electric voltage, 5000-12000V, unsafe home appliance.

Appliances for purifying and/or humidifying gases, especially room air, are known, U.S. Pat. No. 4,829,781; in particular, attention is drawn to the possibility of air purification and humidification by means a plate stack rotating in a liquid.

DISCLOSURE OF INVENTION

Technical Problem

Especially, the conventional water filter air cleaner on the basis of U.S. Pat. No. 4,829,781 has problem with low cleaning efficiency due to passive two dimensional water surface contact, scrubbing contact part of pollution substances only, high humidity with lot of water evaporation, as a result, the corrosion of electronic product, filling water frequently, and Adding pasteurization chemicals.

Technical Solution

Wet type air cleaner utilizing a centrifugal impeller is to eliminate the disadvantages mentioned above and to provide an advantage appliance with aqua viscosity of fine water droplets in the positive three dimensional vortex flow, neutralization reaction with harmful gaseous substances, centrifugal separating on the basis of different specific density, especially air: water 1:1,000, automatic sterilization without pasteurization chemicals according to this invention.

It is composed of atomizer for generating Fine water droplets (0.3□) as in the vortex flow on the basis of positive 3 dimensional scrubbing with aqua viscosity cohesion gas-liquid centrifugal separator for preventing a high humidification problem with utilizing the different specific density (1:1,000, air: water), and liquid circulation pump for reusing liquid for a long time without frequently refilling. Wherein the sort of atomizer comprises aerodynamic venturing tube, ultra sonic vibration, air-water nozzle with blower or compressor.

Advantageous Effects

Wet type air cleaner utilizing a centrifugal impeller with a liquid sprayer and gas-liquid centrifugal separator for cleaning gases, especially air is achieved for more than 99% air purification efficiency with the aqua viscosity of fine water droplets in the positive 3 dimensional vortex flow, neutralization reaction with harmful gaseous substances, centrifugal separating on the basis of different specific density, especially air: water 1:1,000, automatic sterilization without chemical addicts.

This apparatus is based on natural water, thus it is advantages of no more succession of junk pollution material such as an abolished solid filter.

As a result, it is applicable for fresh air in hospital facility including baby room, aseptic surgery, and patient room, automobile, home appliances, office, and school, and industrial facility for semi conduct manufacturing, chemical process, clean room, aseptic laboratory, and military tools for chemical, biological and radiological (CBR) warfare including a personal soldier, a bunker, a tank et al.

The Gas-liquid centrifugal separator may be provided as an auxiliary part of a complex air cleaner or air condition system.

This Wet type air cleaner utilizing a centrifugal impeller is compared with a conventional air cleaner, especially water filter as in the following comparison table. Since water filter air cleaner is still best quality air cleaner with its air purification efficiency worldwide.

Comparison table: conventional water filter air cleaner with this invention

TABLE 1

| comparison item | convensional water filter | the present invention |
|---|---|---|
| Scrubbing mechanism | 2 dimension Water surface contact, less than 85% purification efficiency | 3 dimension fine water droplets vortex contact, 99.9% purification efficiency |
| humidity | Required expensive air cooler, or lot of water Evaporation, High humidity | Centrifugal separation 99.9%, separation complete dry air, low humidity |
| Harmful gases | 30-65% | 99.9% with netralization reaction |
| Airpurification efficiency | 85%, passive contact part on the basis of surface only | 99.9%, positive cubic vortex stream contact on the basis of fine liquid droplets having aqua viscosity |

BRIEF DESCRIPTION OF THE DRAWINGS

FIG. 1 is a perspective view for schematically showing a centrifugal wet type air cleaner according to the present invention;

FIG. 2 is an operational view for schematically showing a centrifugal wet type air cleaner according to the present invention;

FIG. 3 is a perspective view for schematically showing a centrifugal impeller according to the present invention;

FIG. 4 is an operational view for schematically showing a centrifugal humidifier according to the present invention;

FIG. 5 is an operational view for schematically showing a centrifugal humidifying room according to the present invention;

FIG. 6 is an layout view for schematically showing a vortex cylinder according to the present invention;

FIG. 7 is a A-A cross sectional view for schematically showing a second separation plate in FIG. 1;

FIG. 8 is a B-B cross sectional view for schematically showing a first separation plate in FIG. 1;

FIG. 9 is a C-C cross sectional view for schematically showing a vortex room in FIG. 1;

FIG. 10 is a D-D cross sectional view for schematically showing a scrubbing room in FIG. 1;

FIG. 11 is an E-E cross sectional view for schematically showing water outlets and air passages in FIG. 1;

FIG. 12 is a perspective view for schematically showing a fence of centrifugal humidifier in FIG. 1;

FIG. 13 is a perspective view of another embodiment for a centrifugal wet type air cleaner according to the present invention;

FIG. 14 is a operational view of another embodiment for a centrifugal wet type air cleaner according to the present invention;

FIG. 15 is a perspective view of another embodiment for schematically showing an axial flow impeller according to the present invention;

FIG. 16 is a perspective view of another embodiment for a centrifugal wet type air cleaner according to the present invention;

FIG. 17 is a perspective view of another embodiment for a body in FIG. 16;

FIG. 18 is a perspective view of another embodiment for installing a vortex cylinder in FIG. 17;

FIG. 19 is a perspective view for a dual path spiral in FIG. 17;

FIG. 20 is an A-A cross sectional view for a vorex room in FIG. 17;

FIG. 21 is an B-B cross sectional view for water outlets in FIG. 17;

FIG. 22 is an operational view of another embodiment for a body according to the present invention in FIG. 16;

*MARK for major part of figure

401: liquid tank 409: a body, centrifugal wet type air cleaner
408: centrifugal impeller 413: gas passage cylinder
416: spiral grooves 470: spin vaporizer disk
500: vaporizing room 502: scrubbing room
504: vortex room

BEST MODE FOR CARRYING OUT THE INVENTION

Best Mode for Carrying Out the Invention Preferred embodiments of the present invention will be explained hereafter with reference to accompanied embodiments.

As shown in FIG. 1, Centrifugal wet type air cleaner utilizing a spin vaporizer and a spiral on the basis of a labyrinth effect comprising: a body 409 in which a centrifugal impeller 408 rotates with a spin vaporizer disk 470 for sucking air and vaporizing water, to which a housing and a gas passage cylinder 413 are mounted so that a vortex having a centrifugal force length wisely passes by a predetermined distance, the body 409 having an annular vortex room 504 located between the inner wall of the body 409 and the gas passage cylinder 413; a liquid tank 401 mounted on the bottom side of the body 409, through which washing water is supplied; and a liquid tank 401 communicated with the gas suction holes 405, wherein the contaminated substances in the air introduced through the gas suction holes 405 are collected by using the washing water and the air is purified by centrifugal separation by using the difference between the specific gravities of the air and the washing water.

As shown in FIG. 1, A wet type air cleaner as claimed in claim 1, comprising: a vaporizing room 500 located inside of a liquid tank 401, a scrubbing room 502 located on the upper side of a liquid tank 401, a vortex room located inside of a body 409 for scrubbing gas pollutants with the stream of a fine particular liquid mist.

As shown in FIG. 1, A wet type air as claimed in claim 1, comprising: an over driver 436 utilized with the various transfer means including an oil surface friction transmission, a gear transmission et al. for increasing the rotation speed of a centrifugal impeller 408 and a spin vaporizer disk 470.

As shown in FIG. 1, A wet type air as claimed in claim 1, comprising: an ultra sonic vibrator 480 for vaporizing washing water inside of a liquid tank 401.

As shown in FIG. 1, A wet type air cleaner as claimed in claim 1, comprising: an axial fan, a climbed fan and a sirocco fan as a centrifugal impeller 408 for suctioning the stream of the wet air.

As shown in FIG. 1, A wet type air cleaner as claimed in claim 1, comprising: a spin vaporizer mounted on the shaft 435 of an electric motor 433 for vaporizing washing water inside of a liquid tank 401.

As shown in FIG. 1, A wet type air as claimed in claim 1, comprising: spiral grooves 416 formed on the surface of a gas passage cylinder 413 for generating vortex stream of wet gas on the basis of labyrinth effect and separating washing water from gas on the basis of centrifugal force.

As shown in FIG. 1, A wet type air cleaner as claimed in claim 1, comprising: a humidity controller 442 installed on a clean gas outlet 432 for adjusting the humidity of fresh gas.

As shown in FIG. 1, A wet type air cleaner as claimed in claim 1, comprising: a body 409 utilizing for an auxiliary parts in a dehumidifier of compressed air system, refrigerate air conditioner, constant temperature and humidity controller.

As shown in FIG. 13, Centrifugal wet type air cleaner utilizing a spin vaporizer and a spiral on the basis of a labyrinth effect comprising: a body 609 in which a centrifugal impeller 608 rotates with a spin vaporizer disk 670 for sucking air and vaporizing water, to which a housing and a gas passage cylinder 613 are mounted so that a vortex having a centrifugal force length wisely passes by a predetermined distance, the body 609 having an annular vortex room 704 located between the inner wall of the body 609 and the gas passage cylinder 613; a liquid tank 601 mounted on the bottom side of the body 609, through which washing water is supplied; and a liquid tank 601 communicated with the gas suction holes 605 and a scrubbing room 702, wherein the contaminated substances in the air introduced through the gas suction holes 605 are collected by using the washing water and the air is purified by centrifugal separation by using the difference between the specific gravities of the air and the washing water.

As shown in FIG. 13, A wet type air cleaner as claimed in claim 10, comprising: a vaporizing room 700 located inside of a liquid tank 601, a scrubbing room 702 mounted on a liquid tank 601 through a gas passage duct 691, and a vortex room 704 located inside of a body 609 for scrubbing gas pollutants with the stream of a fine particular liquid mist.

As shown in FIG. 13, A wet type air cleaner as claimed in claim 10, comprising: a spin vaporizer mounted on the shaft 635 of an electric motor 633 for vaporizing washing water at a liquid tank 601.

As shown in FIG. 13, A wet type air as claimed in claim 10, comprising: an ultra sonic vibrator 680 for vaporizing washing water at a liquid tank 601.

As shown in FIG. 16 & FIG. 17, Centrifugal wet type air cleaner utilizing a spin vaporizer and a spiral on the basis of a labyrinth effect comprising: a body 807 in which a centrifugal impeller 808 rotates with spiral grooves 816 for sucking air and purifying air by centrifugal separation, to which a housing 809 and a gas passage cylinder 813 are mounted so that a vortex having a centrifugal force length wisely passes by a predetermined distance, the body 807 having an annular vortex room 904 located between the inner wall of a housing 809 and the gas passage cylinder 813; a liquid tank 801 mounted on the body 807 via a gas passage duct 897, through which washing water is supplied; and a liquid tank 801 communicated with the gas suction holes 805 and a scrubbing room 902, wherein the contaminated substances in the air introduced through the gas suction holes 805 are collected by using the washing water and the air is purified by centrifugal separation by using the difference between the specific gravities of the air and the washing water.

As shown in FIG. 16 & FIG. 17, A wet type air cleaner as claimed in claim 14, comprising: a vaporizing room 900 located inside of a liquid tank 801, a scrubbing room 902 mounted on a liquid tank 801 through a gas passage duct 897, and a vortex room 904 located inside of a body 807 for scrubbing gas pollutants with the stream of a fine particular liquid mist.

As shown in FIG. 16, A wet type air cleaner as claimed in claim 14, comprising: a centrifugal humidifier, an ultra sonic vibration humidifier, steam humidifier, a heating humidifier, a high pressure spraying humidifier, an electronic humidifier, generator, high frequency humidifier, and an air-liquid jet nozzle et al. as a liquid atomizer inside of a liquid tank 801.

As shown in FIG. 15, A wet type air cleaner as claimed in claim 14, comprising: an axial fan, a climbed fan and a sirocco fan as a centrifugal impeller 808 for suctioning the stream of the wet air.

As shown in FIG. 17, A wet type air as claimed in claim 14, comprising: an over driver 836 utilized with the various transfer means including an oil surface friction transmission, a gear transmission et al. for increasing the rotation speed of a centrifugal impeller 808.

As shown in FIG. 19, A wet type air cleaner as claimed in claim 14, comprising: spiral grooves 816 having plural lines of groove for passing lot of gas volume.

As shown in FIG. 17, A wet type air cleaner as claimed in claim 14, comprising: a body 807 utilizing for an auxiliary pairs in a compressed air cleaning system, a refrigerate air condition system, a constant temperature and humidity controller.

MODE FOR THE INVENTION

Mode for Invention Preferred embodiments of the present invention will be explained hereafter with reference to accompanied embodiments.

As shown in FIG. 1, Centrifugal wet type air cleaner utilizing a spin vaporizer and a spiral with a labyrinth effect for separating centrifugally liquid including pollution substances from gas, especially air, a gas-liquid centrifugal separator 407 installed on the suction air pipe 405, an electric motor 433 located on gas passage cylinder 413 inside of a body 409, centrifugal wet type air cleaner, centrifugal impeller 408 fixed on electric motor 433 through shaft 435 with installation of over driver 436.

Wherein an over driver 436 is provided for increasing the speed of centrifugal impeller 408 in the case of a low speed of an electric motor 433.

As shown in FIG. 2 and FIG. 3, a centrifugal impeller 408 fixed on an electric motor 433 through a shaft 435 with installation of an over driver 436 is provided for sucking gas and generating centrifugal vortex stream, as indicated by the arrows, with its three dimension aero dynamical structure.

As shown in FIG. 4, a spin vaporizer disk 470 is installed on a shaft 435 of an electric motor 433 for generating fine mist of water in liquid tank 401, thus a centrifugal impeller 408 rotates with A SPIN VAPORIZER disk 470 for sucking air and vaporizing water at the same time.

As shown in FIG. 5, a spin vaporizer disk 470 is composed of sawing teeth 472 and washing water passage 474 for generating fine mist of washing water in liquid tank 401, wherein a separation plate 422 is provided for inducing fine mist of washing water and a fence 476 is provided for separating the mixed stream of fine mist of washing water and the inlet gas through gas through suction holes 405 on the wall of a liquid tank 401, further an ultra sonic vibrator 480 is provided with a vibrator controller 482 for vaporizing washing water inside of a liquid tank 401, further a washing water supplier 402 is provided with a water conduit 403 for keeping constant quantity of washing water inside of a liquid tank 401. Wherein gas suction holes 405 is formed on the wall of a liquid tank 401 for suctioning gas.

As shown in FIG. 6, gas passage cylinder 413 is formed with spiral grooves 416 on the outside circumference surface for keeping up centrifugal vortex gas stream along spiral grooves 416 and for passing downward separated liquid including pollution substances with labyrinth effect at 1st vortex room 504 between the outside of spiral grooves 416 and the inside wall of a body 409.

As shown in FIG. 7 is a A-A cross sectional view for schematically showing a second separation plate in FIG. 1, a second separation plate 460 formed with gas passages 460A, multiple holes is provided for discharging clean gas.

FIG. 8 is a B-B cross sectional view for schematically showing a first separation plate in FIG. 1; a first separation plate 450 formed with gas passages 450A, multiple holes is provided for discharging clean gas.

FIG. 9 is a C-C cross sectional view for schematically showing a vortex room in FIG. 1; vortex room 504 is provided between the outside of spiral grooves 416 and the inside wall of a body 409, centrifugal wet type air cleaner, thus the mixed gas-liquid stream is distributed to spiral grooves 416, as indicated by the arrows, for keeping up centrifugal vortex gas stream along spiral grooves 416 and for passing downward separated liquid including pollution substances with labyrinth effect at vortex room 504 between the outside of spiral grooves 416 and the inside wall of a body 409. Therefore the liquid is separated with pollution substances from gas stream with centrifugal force due to the different specific gravity of gas and liquid at 1st vortex room 504 between the outside of spiral grooves 416 and the inside wall of housing 409, as indicated by the arrows. Thus the liquid containing pollution substances is flowed downward with gravity effect on the inside wall of a body 409.

FIG. 10 is a D-D cross sectional view for schematically showing a scrubbing room in FIG. 1; a scrubbing room 502 is provided for scrubbing pollutants with the mist stream of washing water through scrubbing cylinder 493 and impeller inlet guide 498 inside of a liquid tank 401. Wherein multiple friction protrusion 493A are formed on the both surface of scrubbing cylinder 493 for generating a turbulent flow of mist stream.

FIG. 11 is an E-E cross sectional view for schematically showing water outlets and air passages in FIG. 1; a separating plate 422 is provided for passing gas with the mist stream of washing water, also a separating plate 422 is provided for draining used water. Wherein multiple gas and water passages 422A are formed on a separating plate 422.

FIG. 12 is a perspective view for schematically showing a fence of centrifugal humidifier in FIG. 1; a fence 476 is provided for separating the mixed stream of fine mist of washing water and the gas flowed in through gas suction holes 405 on the wall of liquid tank 401.

As shown in FIG. 2, as described in above statement, a grill or screen usually called 'pre filter' is provided on the gas suction holes 405 of the wall of liquid tank 401 for preventing large grain in air, and spin vaporizer disk 470 is provided for generating fine mist of washing water. Therefore centrifugal impeller 408 is rotated with the power of electric motor 433 inside of a body 409 for inducing gas stream through gas suction holes 405 communicated with liquid tank 401, and then liquid, especially water is atomized or sprayed by spin vaporizer disk 470 from liquid tank 401 as indicated by the arrows, also ultra sonic vibrator 480 is provided for adjusting the quantity of liquid atomization, thus scrubbing pollution substances in gas is scrubbed with the numerous atomizing liquid droplets as in the flow of fog or mist, wherein the pollution substances of gas are scrubbed efficiently with the viscosity of liquid mist or fine aqua droplets in the three-dimensional cubic vortex flow of fog or mist.

Hereafter, as shown in FIG. 2, the mixed gas-liquid stream is formed as centrifugal vortex stream after passing with centrifugal impeller 408, thus the mixed gas-liquid stream is passed around spiral grooves 416 of gas passage cylinder 413, as indicated by the arrows, on the state of centrifugal vortex gas stream along spiral grooves 416. thus liquid including pollution substances is separated centrifugally from mixed gas-liquid stream by using the difference between the specific gravities of the air and the washing water and labyrinth effect at 1st vortex room 504 between the spiral grooves 416 and the wall of a body 409. thus liquid including pollution substances is gathered downwardly at liquid tank 401 through gas and water passages 422A of a separating plate 422. finally, after all, the gas is purified by centrifugal separation by using the difference between the specific gravities of the air and the washing water and labyrinth effect at 1st vortex room 504 between the outside of spiral grooves 416 and the inside wall of a body 409. thus clean dry gas is discharged at clean gas pipe 432, outside of a body 409 after staying a gas tank 508 through gas passages 450A of a first separation plate 450 and gas passages 460A of a second separation plate 460.

Further, as shown in FIG. 2, the gas stream mixed with the atomized liquid droplets is flowed in inside of a body 409, gas-liquid centrifugal separator through gas suction holes 405 with the inducing power of centrifugal impeller 408 rotating by the power of electric motor 433 as indicated by the arrows, thus the mixed gas-liquid stream is formed as centrifugal vortex stream after passing with centrifugal impeller 408, as shown in FIG. 3, the mixed gas-liquid stream is distributed to spiral grooves 416, as indicated by the arrows, for keeping up centrifugal vortex gas stream along spiral grooves 416 and for passing downward separated liquid including pollution substances with labyrinth effect at vortex room 504 between the spiral grooves 416 and the wall of housing 409.

Therefore, as shown in FIG. 9, the liquid is separated with pollution substances from gas stream with centrifugal force due to the different specific gravity of gas and liquid at vortex room 504 between the outside of spiral grooves 416 and the inside wall of a body 409, as indicated by the arrows. Thus the liquid containing pollution substances is flowed downward with gravity effect on the inside wall of body 409. Further the liquid containing pollution substances is gathered with gravity effect at liquid tank 401 through plurality of gas & water passages 422A formed on separating plate 422 as shown in FIG. 11. Wherein said drain trap may be provided for discharging liquid containing pollution substances only but not gas, especially fresh air, and the operation of drain trap is not necessary to explain in this mode as in well known pneumatic wares in industrial parts.

Meanwhile, As shown in FIG. 2, the gas stream is passed as centrifugal flow for eliminating fluid containing pollutant substances along spiral grooves 416, as shown in FIG. 6, at vortex room 504 between gas passage cylinder 413 and the inside wall of housing 409, as indicated by the arrows.

Further small amount of extra liquid in gas is drained once more after passing a separating room 506 between a first separation plate 450 and a second separation plate 460. Thus clean gas, especially 'fresh air', is discharged through clean gas pipe 432. Wherein humidity controller 442 is installed with adding aroma, perfume et al. on clean gas pipe 432 for adjusting humidity as shown in FIG. 1.

As shown in FIG. 13, Centrifugal wet type air cleaner utilizing a spin vaporizer and a spiral on the basis of a labyrinth effect is comprised of a vaporizing room 700 located inside of a liquid tank 601, a scrubbing room 702 mounted on a liquid tank 601 through a gas passage duct 691, and a vortex room 704 located inside of a body 609 for scrubbing gas pollutants with the stream of a fine particular liquid mist. thus a spin vaporizer disk 670 is installed on a shaft 635 of an electric motor 633 for generating fine mist of water in liquid tank 601, thus a centrifugal impeller 608 rotates with a spin vaporizer disk 670 for sucking air and vaporizing water at the same time.

As shown in FIG. 14, the mixed gas-liquid stream is passed as centrifugal vortex stream after passing with centrifugal impeller 608 and generating fine mist of washing water with rotating a spin vaporizer disk 670 in liquid tank 601 at the same time, thus the mixed gas-liquid stream is passed at scrubbing room 702 through gas passage duct 691 for scrubbing pollutants in gas with using fine mist of washing water.

Thus the mixed gas-liquid stream is passed at spiral grooves 616 of gas passage cylinder 613, as indicated by the arrows, on the state of centrifugal vortex gas stream along spiral grooves 616. thus liquid including pollution substances is separated centrifugally from mixed gas-liquid stream by using the difference between the specific gravities of the air and the washing water and labyrinth effect at 1st vortex room 704 between the spiral grooves 616 and the wall of a body 609. thus liquid including pollution substances is gathered downwardly at liquid tank 601 through water drain passages 622A of a separating plate 622. finally, after all, the gas is purified by centrifugal separation by using the difference between the specific gravities of the air and the washing water and labyrinth effect at 1st vortex room 704 between the outside of spiral grooves 616 and the inside wall of a body 609. thus clean dry gas is discharged at clean gas pipe 632, outside of a body 609 after passing separating room 706 through gas passages 650 formed on the bottom side of gas passage cylinder 613.

Further, As shown in FIG. 14, the gas stream mixed with the atomized liquid droplets is flowed in inside of a body 609, gas-liquid centrifugal separator through gas suction holes 605 with the inducing power of centrifugal impeller 608 rotating by the power of electric motor 633 as indicated by the arrows, thus the mixed gas-liquid stream is formed as centrifugal vortex stream after passing with centrifugal impeller 608, the mixed gas-liquid stream is passed around spiral grooves 616, as indicated by the arrows, for keeping up centrifugal vortex gas stream along spiral grooves 616 and for passing downward separated liquid including pollution substances with labyrinth effect at vortex room 704 between the spiral grooves 616 and the wall of a body 609.

As shown in FIG. 13, Centrifugal wet type air cleaner utilizing a spin vaporizer and a spiral on the basis of a labyrinth effect is comprised of a spin vaporizer with mounting spin vaporizer disk 670 on the shaft 635 of an electric motor 633 for vaporizing washing water at a liquid tank 601. thus saw tooth 672 is provided at the upper part of a spin vaporizer disk 670 for generating fine mist of washing water and water passage 674 is provided at the bottom part of a spin vaporizer disk 670 for supplying washing water.

As shown in FIG. 13, Centrifugal wet type air cleaner utilizing a spin vaporizer and a spiral with a labyrinth effect is comprised of an ultra sonic vibrator 680 for vaporizing washing water inside of a liquid tank 601. wherein a vibrator controller 482 is provided with an ultra sonic vibrator 680 for vaporizing washing water at a liquid tank 601.

Further a washing water supplier 602 is provided with a water conduit 603 for keeping constant quantity of washing water inside of a liquid tank 601. wherein gas suction holes 605 is formed on the wall of a liquid tank 601 for suctioning gas.

As shown in FIG. 16 & FIG. 17, Centrifugal wet type air cleaner utilizing a spin vaporizer and a spiral on the basis of a labyrinth effect comprising: a body 807 in which a centrifugal impeller 808 rotates with spiral grooves 816 for sucking gas and purifying gas by centrifugal separation, to which a body 807 and a gas passage cylinder 813 are mounted so that a vortex having a centrifugal force length wisely passes by a predetermined distance, the body 807 having an annular vortex room 904 located between the inner wall of the body 807 and the gas passage cylinder 813; a liquid tank 801 mounted on the body 807 via a gas passage duct 897, through which washing water is supplied; and a liquid tank 801 communicated with the gas suction passages 805 and a scrubbing room 902, wherein the contaminated substances in the air introduced through the gas suction passages 805 are collected by using the washing water and the air is purified by centrifugal separation by using the difference between the specific gravities of the air and the washing water.

As shown in FIG. 16, the gas is suctioned through gas suction passages 805 on a liquid tank 801 after rotating centrifugal impeller 808, and then the gas is scrubbed with fine mist of washing water after passing a vaporizing room 900, thus the mixed gas-liquid stream is passed at scrubbing room 902 through scrubber 893 for scrubbing pollutants in gas with using fine mist of washing water. thus the mixed gas-liquid stream is passed at spiral grooves 816 of gas passage cylinder 813 in a body 807 through a gas passage duct 897, as indicated by the arrows, on the state of centrifugal vortex gas stream along spiral grooves 816.

Further, as shown in FIG. 21 and FIG. 22, liquid including pollution substances is separated centrifugally from mixed gas-liquid stream by using the difference between the specific gravities of the air and the washing water and labyrinth effect at 1st vortex room 904 between the spiral grooves 816 and the wall of a body 807. thus liquid including pollution substances is gathered downwardly at drain room 908 through water drain passages 822A of a separating plate 822. Also a clean gas passage 832A is provided for discharging clean gas and an electric line holes 833A is provided for connecting an electric lines with an electric motor 833 supplying on a separating plate 822.

Furthermore, as shown in FIG. 20, the gas is purified by centrifugal separation by using the difference between the specific gravities of the air and the washing water and labyrinth effect at 1st vortex room 904 between the spiral grooves 816 and the wall of a housing 809. Since the vortex cylinder 813 formed with spiral grooves 816 is rotated with the rotation power of an electric motor 833 around a motor cylinder 850.

Thus, as shown in FIG. 22, clean dry gas is discharged at clean gas pipe 832, outside of a body 807 after passing a second vortex room 906 through gas passages 850A formed on the bottom part of a motor cylinder 850.

As shown in FIG. 16 & FIG. 17, Centrifugal wet type air cleaner utilizing a spin vaporizer and a spiral with a labyrinth effect is comprised of a vaporizing room 900 located inside of a liquid tank 801, a scrubbing room 902 mounted on a liquid tank 801 through a gas passage duct 897, and a vortex room 904 located inside of a body 807 for scrubbing gas pollutants with the stream of a fine particular liquid mist.

As shown in FIG. 16, Centrifugal wet type air cleaner utilizing a spin vaporizer and a spiral on the basis of a labyrinth effect is comprised of a centrifugal humidifier, an ultra sonic vibration humidifier, steam humidifier, a heating humidifier, a high pressure spraying humidifier, an electronic humidifier, generator, high frequency humidifier, and an air-liquid jet nozzle et al. as a liquid atomizer inside of a liquid tank 801. wherein washing water is contained in side of a liquid tank 801.

As shown in FIG. 15, Centrifugal wet type air cleaner utilizing a spin vaporizer and a spiral on the basis of a labyrinth effect is comprised of an axial fan, a climbed fan and a sirocco fan as a centrifugal impeller 808 for suctioning the stream of the wet air.

As shown in FIG. 18, Centrifugal wet type air cleaner utilizing a spin vaporizer and a spiral with a labyrinth effect is comprised of an over driver 836 utilized with the various transfer means including an oil surface friction transmission, a gear transmission et al. for increasing the rotation speed of a centrifugal impeller 808 in the case of utilizing low rotation speed of an electric motor 833.

As shown in FIG. 19, Centrifugal wet type air cleaner utilizing a spin vaporizer and a spiral on the basis of a labyrinth effect is comprised of spiral grooves 816 having plural lines of groove for passing air for passing lot of gas volume.

As shown in FIG. 17, Centrifugal wet type air cleaner utilizing a spin vaporizer and a spiral on the basis of a labyrinth effect is comprised of a body 807 utilizing for an auxiliary parts in a dehumidifier of compressed air system, refrigerate air conditioner, constant temperature and humidity controller. thus centrifugal wet type air cleaner according to the present invention may be installed and operated with a compressed air cleaner or air conditioning system for utilizing gas-liquid centrifugal separation efficiency. therefore the Gas-liquid centrifugal separator may be provided for the auxiliary part of a complex air cleaner and air condition system.

Thus scrubbing pollution substances including dust (less than 0.01□'s small size), bacteria, virus, mist, mite, cigarette smoke, harmful gas may be cleaned with the aqua viscosity of fine liquid mist, especially natural water (H2O).

Wherein the atomization mechanism of a body, the atomizer of a centrifugal wet type air cleaner may be operated with various type including aerodynamic venturing tube, ultrasonic vibration, and gas-liquid nozzle with blower or compressor.

Further a liquid circulation pump (not shown) may be installed with a liquid or water filter (not shown) for circulating and reusing liquid for a long time without frequently refilling between a body, centrifugal wet type air cleaner and said drain trap on the bottom of a body, gas-liquid centrifugal separator. also a cleaning liquid screen (not shown) may be prepared inside of a body, gas-liquid centrifugal separator for circulating and reusing liquid or water.

Furthermore the atomization mechanism of a body, the atomizer of a centrifugal wet type air cleaner may be operated with various type including aerodynamic venturing tube, ultrasonic vibration, and gas-liquid nozzle with blower or compressor. Thus fine liquid droplets, especially water droplets (0.3 micron meter size) is generated in the vortex flow with said atomizer for scrubbing fine particles and neutralizing harmful gaseous substances on the basis of 3 dimensional aqua viscosity cohesion.

Thus a body, centrifugal wet type air cleaner with a liquid sprayer and gas-liquid centrifugal separator for cleaning gases, especially air is achieved for more than 99 percentage air purification efficiency with the aqua viscosity of fine water droplets in the positive 3 dimensional vortex flow, neutralization reaction with harmful gaseous substances, centrifugal separating on the basis of different specific density, especially air to water 1 to 1000, automatic sterilization without chemical addicts.

As a result, it is applicable for fresh air in hospital facility including baby room, aseptic surgery, and patient room, automobile, home appliances, office, and school, and industrial facility for semi conduct manufacturing, chemical process, clean room, aseptic laboratory, a part of air condition system and military tools for chemical, biological and radiological (CBR) warfare including a personal soldier, a bunker, a tank et al.

Wherein said gas comprises air, vapor, ammonia, nitrogen, hydrogen, ozone and oxygen et al. in the form of continuous gases, and liquid comprises water, lubricant oil, rust, dust and carbonated material et al.

INDUSTRIAL APPLICABILITY

Wet type air cleaner utilizing a centrifugal impeller with a liquid sprayer and gas-liquid centrifugal separator for cleaning gases, especially air is achieved for more than 99 percentage air purification efficiency with the aqua viscosity of fine water droplets in the positive 3 dimensional vortex flow, neutralization reaction with harmful gaseous substances, centrifugal separating on the basis of different specific density, especially air to water 1 to 1000, automatic sterilization without chemical addicts.

As a result, it is applicable for fresh air in hospital facility including baby room, aseptic surgery, and patient room, automobile, home appliances, office, and school, and industrial facility for semi conduct manufacturing, chemical process, clean room, aseptic laboratory, and military tools for chemical, biological and radiological (CBR) warfare including a personal soldier, a bunker, a tank et al.

The Gas-liquid centrifugal separator may be provided for the auxiliary part of a complex air cleaner and air condition system.

Sequence Listing

The invention claimed is:

1. Centrifugal wet type air cleaner utilizing a spin vaporizer and a spiral on the basis of a labyrinth effect, the air cleaner comprising:

A body in which a centrifugal impeller rotates with a spin vaporizer disk for sucking air and vaporizing water;

An annular vortex room located downstream of the centrifugal impeller and defined between an inner wall of the body and a gas passage cylinder mounted within the body;

A liquid tank for supplying washing water mounted on a bottom side of the body and located upstream of the centrifugal impeller, the liquid tank having gas suction holes formed therethrough for suctioning air;

Wherein the contaminated substances in the air introduced through the gas suction holes are collected by using the washing water and the air is purified by centrifugal separation by using the difference between the specific gravities of the air and the washing water and the centrifugal force along the annular vortex room.

2. A wet type air cleaner as claimed in claim 1, further comprising: a vaporizing room located inside of the liquid tank, a scrubbing room defined within the body and located on the upper side of a liquid tank, a vortex room located inside of a body for scrubbing gas pollutants with the stream of a fine particular liquid mist.

3. A wet type air as claimed in claim 1, further comprising: an over driver utilized with the various transfer means including an oil surface friction transmission, a gear transmission for increasing the rotation speed of the centrifugal impeller and the spin vaporizer disk.

4. A wet type as claimed in claim 1, further comprising: an ultra sonic vibrator for vaporizing the washing water inside of the liquid tank.

5. A wet type air cleaner as claimed in claim 1, wherein the centrifugal impeller includes at least one of an axial fan, a climbed fan and a sirocco fan for suctioning the stream of the wet air.

6. A wet type air cleaner as claimed in claim 1, further comprising: a spin vaporizer mounted on the shaft of an electric motor for vaporizing washing water inside of the liquid tank.

7. A wet type air cleaner as claimed in claim 1, wherein spiral grooves are formed on the surface of the gas passage cylinder for generating vortex stream of wet gas on the basis of labyrinth effect and separating washing water from gas on the basis of centrifugal force.

8. A wet type air cleaner as claimed in claim 1, further comprising: a humidity controller installed on a clean gas outlet for adjusting the humidity of fresh gas.

9. A wet type air cleaner as claimed in claim 1, further comprising: the body utilizing for an auxiliary parts in a dehumidifier of compressed air system, refrigerate air conditioner, constant temperature and humidity controller.

10. A wet type air cleaner for purifying contamination from air using a labyrinth effect, the air cleaner comprising:

An air cleaner housing having a centrifugal vaporizer for drawing in air and vaporizing washing water to form a wet air mixture;

A reservoir mounted to the housing for supplying the washing water, the reservoir located upstream of the centrifugal impeller; and An annular vortex room located downstream of the centrifugal impeller for generating a centrifugal force on the wet air mixture, the annular vortex room defined between an inner wall of the body and a gas passage cylinder mounted within the housing;

Wherein the air being purified when contamination in the air is collected by the washing water in the wet air mixture, the wet air mixture subsequently flowing through the vortex room so that the centrifugal force separates the contamination and washing water from the purified air because of the difference between the specific gravities of the air and the washing water.

11. A wet type air cleaner as claimed in claim 10, wherein spiral grooves are formed on the surface of the gas passage cylinder for generating a vortex stream of the wet air mixture on the basis of labyrinth effect.

12. A wet type air cleaner as claimed in claim 10, further comprising a clean air outlet located downstream of the vortex room.

13. A wet type air cleaner as claimed in claim 10, further comprising a clean air outlet having a flowpath substantially perpendicular to the centrifugal force .

14. A wet type air cleaner as claimed in claim 10 wherein the centrifugal vaporizer includes a centrifugal impeller and a vaporizer disk.

15. A wet type air cleaner as claimed in claim 10 wherein gas suction holes for introducing the air formed in at least one of the liquid tank and the housing.

16. A wet type air cleaner as claimed in claim 10 further comprising, a scrubbing room disposed between the centrifugal vaporizer and the vortex room, the scrubbing adapted to form the wet air mixture into a wet air stream with a labyrinth effect.

17. A wet type air cleaner as claimed in claim 15 further comprising, a scrubbing cylinder and a vortex room inlet portion disposed in the scrubbing room to form the wet air mixture into a wet air stream with a labyrinth effect.

18. A wet type air cleaner as claimed in claim 1, further comprising a clean air outlet located downstream of the vortex room.

19. A wet type air cleaner as claimed in claim 1, further comprising a clean air outlet having a flowpath substantially perpendicular to the centrifugal force.

20. A wet type air cleaner as claimed in claim 2 further comprising, a scrubbing cylinder and a vortex room inlet portion disposed in the scrubbing room to form the wet air mixture into a wet air stream with a labyrinth effect.

* * * * *

UNITED STATES PATENT AND TRADEMARK OFFICE
CERTIFICATE OF CORRECTION

| | | |
|---|---|---|
| PATENT NO. | : 8,012,248 B2 | Page 1 of 1 |
| APPLICATION NO. | : 11/815496 | |
| DATED | : September 6, 2011 | |
| INVENTOR(S) | : Jangshik Yun | |

It is certified that error appears in the above-identified patent and that said Letters Patent is hereby corrected as shown below:

Column 12, Line 22, Claim 3:

After "A wet type air"
Insert -- cleaner --.

Column 12, Line 27, Claim 4:

After "A wet type"
Insert -- air cleaner --.

Signed and Sealed this
Third Day of January, 2012

David J. Kappos
*Director of the United States Patent and Trademark Office*